US012776660B2

(12) United States Patent
Becker et al.

(10) Patent No.: US 12,776,660 B2
(45) Date of Patent: Oct. 27, 2026

(54) ENERGY HARVESTING ANTENNA FOR HARVESTING ENERGY FROM FREQUENCY MODULATION RADIO SIGNALS

(71) Applicant: Wiliot, Ltd., Caesarea (IL)

(72) Inventors: Oleg Becker, Holon (IL); Alon Yehezkely, Haifa (IL)

(73) Assignee: Wiliot, Ltd., Caesarea (IL)

( * ) Notice: Subject to any disclaimer, the term of this patent is extended or adjusted under 35 U.S.C. 154(b) by 403 days.

(21) Appl. No.: 17/235,473

(22) Filed: Apr. 20, 2021

(65) Prior Publication Data

US 2021/0328459 A1 Oct. 21, 2021

Related U.S. Application Data

(60) Provisional application No. 63/012,424, filed on Apr. 20, 2020.

(51) Int. Cl.
*H02J 50/00* (2016.01)
*H01Q 1/24* (2006.01)
*H01Q 1/38* (2006.01)
*H01Q 7/00* (2006.01)
*H02J 50/10* (2016.01)
*H02J 50/20* (2016.01)

(52) U.S. Cl.
CPC ........... *H02J 50/001* (2020.01); *H01Q 1/248* (2013.01); *H01Q 1/38* (2013.01); *H01Q 7/00* (2013.01); *H02J 50/10* (2016.02); *H02J 50/20* (2016.02)

(58) Field of Classification Search
CPC ........... H02J 50/001; H02J 50/10; H02J 50/12
See application file for complete search history.

(56) References Cited

U.S. PATENT DOCUMENTS 4,461,040 A * 7/1984 Dobrovolny ......... H03D 9/0633 455/330
7,266,269 B2 9/2007 Koste et al.
7,719,416 B2 5/2010 Arms et al.
8,552,597 B2 10/2013 Song et al.
(Continued)

FOREIGN PATENT DOCUMENTS

CN 102570628 A 7/2012
WO 2005046040 A2 5/2005

OTHER PUBLICATIONS

A. Noguchi and H. Arai, "Small loop rectenna for RF energy harvesting," 2013 Asia-Pacific Microwave Conference Proceedings (APMC), 2013, pp. 86-88, doi: 10.1109/APMC.2013.6695199.
(Continued)

*Primary Examiner* — Rexford N Barnie
*Assistant Examiner* — Joseph N Inge
(74) *Attorney, Agent, or Firm* — M&B IP Analysts, LLC

(57) ABSTRACT

An antenna for harvesting energy from frequency modulation radio signals are provided. An antenna for harvesting energy from frequency modulation (FM) radio signals includes a loop element coupled to an energy harvester; and an inductive element coupled to the loop element, wherein the inductive element is a planar inductor designed to allow impedance matching with the energy harvester, wherein the inductive element that extends an electric field of the loop element, wherein the loop element and the inductive element resonate at an FM frequency band.

20 Claims, 9 Drawing Sheets

(56) References Cited

U.S. PATENT DOCUMENTS

| | | | | |
|---|---|---|---|---|
| 8,621,245 | B2 | 12/2013 | Shearer et al. | |
| 9,095,729 | B2 | 8/2015 | John | |
| 2011/0101789 | A1 | 5/2011 | Salter, Jr. et al. | |
| 2012/0007441 | A1 | 1/2012 | John | |
| 2012/0256492 | A1* | 10/2012 | Song | H02J 50/27 307/64 |
| 2013/0249301 | A1* | 9/2013 | Smoot | H02J 50/001 307/104 |
| 2013/0328416 | A1 | 12/2013 | Whitworth et al. | |
| 2016/0020636 | A1* | 1/2016 | Khlat | H02J 50/001 320/108 |
| 2016/0315506 | A1 | 10/2016 | John | |
| 2017/0027043 | A1* | 1/2017 | Greene | H04W 40/22 |
| 2017/0237466 | A1* | 8/2017 | Carr | H04B 5/0031 455/41.1 |
| 2018/0006366 | A1* | 1/2018 | Hur | H01Q 1/24 |
| 2018/0283913 | A1* | 10/2018 | Chen | G01D 21/00 |
| 2019/0267846 | A1 | 8/2019 | Shearer et al. | |
| 2020/0169230 | A1* | 5/2020 | Gruner | H01J 37/32183 |
| 2021/0313283 | A1* | 10/2021 | Wilson | H10W 40/778 |

OTHER PUBLICATIONS

C. Sauer, M. Stanacevic, G. Cauwenberghs and N. Thakor, "Power harvesting and telemetry in CMOS for implanted devices," in IEEE Transactions on Circuits and Systems I: Regular Papers, vol. 52, No. 12, pp. 2605-2613, Dec. 2005, doi: 10.1109/TCSI.2005.858183.

Clayton et al. "Power Harvesting Practices and Technology Gaps for Sensor Networks". September ~ 2012. https://heup.inl.gov/SiteAssets/FY2014%20Documents/NEET-2.1%20Power%20Harvesting%20Practices%20and%20Technology%20Gaps%20for%20Sensor%20Networks%20(ORNL-TM-2012-442).pdf.

H. Arai, M. Chomora and M. Yoshida, "A voltage-boosting antenna for RF energy harvesting," 2012 IEEE International Workshop on Antenna Technology (iWAT), 2012, pp. 169-172, doi: 10.1109/IWAT.2012.6178638.

Hawkes et al. A microwave metamaterial with integrated power harvesting functionality. Oct. 14, 2013. https://aip.scitation.org/doi/abs/10.1063/1.4824473.

M. Ali, L. Albasha and N. Qaddoumi, "RF energy harvesting for autonomous wireless sensor networks," 2013 8th International Conference on Design & Technology of Integrated Systems in Nanoscale Era (DTIS), 2013, pp. 78-81, doi: 10.1109/DTIS.2013.6527782.

M. Duffy and D. Carroll, "Electromagnetic generators for power harvesting," 2004 IEEE 35th Annual Power Electronics Specialists Conference (IEEE Cat. No.04CH37551), 2004, pp. 2075-2081 vol. 3, doi: 10.1109/PESC.2004.1355438.

M. Ferrari, V. Ferrari, D. Marioli and A. Taroni, "Modeling, Fabrication and Performance Measurements of a Piezoelectric Energy Converter for Power Harvesting in Autonomous Microsystems," in IEEE Transactions on Instrumentation and Measurement, vol. 55, No. 6, pp. 2096-2101, Dec. 2006, doi: 10.1109/TIM.2006.884114.

M. Muramatsu and H. Koizumi, "An experimental result using RF energy harvesting circuit with Dickson charge pump," 2010 IEEE International Conference on Sustainable Energy Technologies (ICSET), 2010, pp. 1-4, doi: 10.1109/ICSET.2010.5684935.

M. Tabesh, N. Dolatsha, A. Arbabian and A. M. Niknejad, "A Power-Harvesting Pad-Less Millimeter-Sized Radio," in IEEE Journal of Solid-State Circuits, vol. 50, No. 4, pp. 962-977, Apr. 2015, doi: 10.1109/JSSC.2014.2384034.

Meddad et al. "An adaptive prototype design to maximize power harvesting using electrostrictive polymers". Sep. 13, 2012. https://aip.scitation.org/doi/abs/10.1063/1.4751456.

Mohi El-deen Ahmad. "Energy Harvesting Using a Cheap Easy-to-Fabricate FM Rectenna". Jul. 1, 1905. https://www.semanticscholar.org/paper/Energy-Harvesting-Using-a-Cheap-Easy-to-Ahmad/cfdd31f6815a4d96cc4b6815739a8910fa58fa29.

Mutee-Ur-Rehman, M. I. Qureshi, W. Ahmad and W. T. Khan, "Radio frequency energy harvesting from ambient FM signals for making battery-less sensor nodes for wireless sensor networks," 2017 IEEE Asia Pacific Microwave Conference (APMC), 2017, pp. 487-490, doi: 10.1109/APMC.2017.8251487.

Pourghodrat et al. "Power harvesting systems design for railroad safety". Apr. 4, 2013. https://journals.sagepub.com/doi/abs/10.1177/0954409713482659.

Quan Wang and Nan Wu. "Optimal design of a piezoelectric coupled beam for power harvesting". Jul. 20, 2012. https://iopscience.iop.org/article/10.1088/0964-1726/21/8/085013/meta.

Steven R. Anton and Henry A. Sodano. "A review of power harvesting using piezoelectric materials (2003-2006)". May 18, 2007.https://iopscience.iop.org/article/10.1088/0964-1726/16/3/R01/meta.

Vougioukas, G; et al. "Practical Energy Harvesting for Batteryless Ambient Backscatter Sensors". Jun. 13, 2018. https://www.google.com/url?sa=t&rct=j&q=&esrc=s&source=web&cd=&ved=2ahUKEwiQ1pLeifnvAhVWiuAKHUDQCowQFjAMegQIGBAD&url=https%3A%2F%2Fwww.mdpi.com%2F2079-9292%2F7%2F6%2F95%2Fpdf&usg=AOvVaw00sW-2jMLXfAoWJI0blKm5.

* cited by examiner

ENERGY HARVESTING ANTENNA FOR HARVESTING ENERGY FROM FREQUENCY MODULATION RADIO SIGNALS

CROSS-REFERENCE TO RELATED APPLICATIONS

This application claims the benefit of U.S. Provisional Application No. 63/012,424 filed on Apr. 20, 2020, the contents of which are hereby incorporated by reference.

TECHNICAL FIELD

The present disclosure relates generally to energy harvesting and, more specifically, to antennas for harvesting power from Frequency Modulation (FM) signals.

BACKGROUND

The Internet of things (IoT) is the inter-networking of physical devices, vehicles, buildings, and other items embedded with electronics, software, sensors, actuators, and network connectivity that enable these objects to collect and exchange data. IoT is expected to offer advanced connectivity of devices, systems, and services that goes beyond machine-to-machine (M2M) communications and covers a variety of protocols, domains, and applications.

IoT can be encapsulated in a wide variety of devices, such as heart monitoring implants; biochip transponders on farm animals; automobiles with built-in sensors; automation of lighting, heating, ventilation, air conditioning (HVAC) systems; and appliances such as washer/dryers, robotic vacuums, air purifiers, ovens or refrigerators/freezers that use Wi-Fi for remote monitoring. Typically, IoT devices encapsulate wireless sensors or a network of such sensors.

Most IoT devices are wireless devices that collect data and transmit such data to a central controller. There are a few requirements to be met to allow widespread deployment of IoT devices. Such requirements include reliable communication links, low energy consumption, and low maintenance costs.

An alternative to using batteries is power which may be harvested from sources such as light, movement, and electromagnetic power such as existing radio frequency transmissions. The harvested power is stored in a capacitor or a rechargeable battery, and is typically managed by a power management unit (PMU). A PMU is a circuit that performs general circuit power related operations, such as supply regulation, voltage and current references, power on indication, brown-out indication, power modes control, management of power storage units, and more.

Specifically, in power harvesting systems, a PMU provides energy storage and voltage threshold crossing indications based on measurement of the voltage over the storage capacitors.

FIG. 1 shows a diagram of a conventional harvester system 100 based on an energy harvester 110. The energy harvester 110 is coupled to a PMU 120 including a Schmitt trigger 122. The energy harvester 110 receives RF signals transmitted by external resources. The energy of the received RF signals charges a capacitor 112, where the conversion of energy to current is performed by means of a voltage multiplier 114. A voltage multiplier 114 is an electrical circuit that converts AC electrical power to a DC voltage and cascades its DC outputs to multiply the output voltage level, typically using a network of capacitors and diodes or switches. An example for such a multiplier is a Dickson multiplier.

The PMU 120 determines when the voltage level at the capacitor 112 is sufficient so that the harvester system 100 can run computing tasks, and transmit, and/or receive, signals. For example, a reference voltage threshold ($V_{ref}$) is compared to the voltage level ($V_{in}$) at the capacitor 112. Once the voltage level $V_{in}$ is over the threshold ($V_{ref}$), the Schmitt trigger 122 switches from zero to one, signaling that the energy harvester 110 device has sufficient power.

A Schmitt trigger 122 is a comparator circuit with a hysteresis 124 implemented by applying positive feedback to the noninverting input of a comparator or differential amplifier. Here, a Schmitt trigger is an active circuit which converts an analog input signal to a digital output signal via a comparator and has a hysteresis. As such, power is required to operate the Schmitt trigger 122. The power is provided by the energy harvester 110.

One of the challenges of designing an energy harvester for IoT devices is the availability of ambient energy and the physical size of the harvester. Frequency Modulation (FM) radio signals are broadcast around the world and can be received in areas where other radio frequency (RF) signals such as, Wi-Fi, cellular, and Bluetooth Low Energy (BLE) signals are not available. However, harvesting signals from FM radio signals may provide some challenges as to the size of the energy harvester, and, in particular, its FM antenna.

FM antennas are designed to receive signals in the FM broadcast band, generally between 88 MHz and 108 MHz. For effective FM reception, a dipole antenna is utilized, and a size of such antenna is roughly one-quarter the length of radio waves in the FM radio band. A typically FM dipole antenna would be of a length of 150 centimeters. This may be a real challenge when such an antenna has to be installed in a small physical size IoT device, typically with flexible form factors. For example, a size of an IoT device may be a size of a U.S. quarter coin and the form factor may be of a label. Thus, there is a need to design a compact and efficient FM antenna in order to allow energy harvesting for small-sized IoT devices.

The efficiency of an antenna is determined by the ohmic and dielectric losses, mismatch to chip loss, and polarization loss. Further, as a harvesting antenna is connected to a system on chip (SoC), the antenna should be impedance matched to the chip's interface which is generally capacitive in nature. Some FM antenna types are discussed in the art. One type is an inductive loop antenna that may provide good impedance matching. However, for a high aspect-ratio, a small loop will be a very inefficient radiator, as opposite currents flow in opposing long sides of the loop. Another antenna type is a dipole antenna which can be designed without opposite currents which will reduce its efficiency. The main disadvantage of a dipole antennas is that their input impedance is capacitive in nature and, to become inductive, their length needs to be increased by means of meandering. This yields a solution which is not sufficiently compact.

Further, mass-production of low-cost IoT devices require using low-cost type of substrate, thus multi-layer substrates that can be formed with vias, are not feasible option.

It would therefore be advantageous to provide a solution that would harvest energy from FM signals in IoT devices.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "certain embodiments" may be used herein to refer to a single embodiment or multiple embodiments of the disclosure.

Certain embodiments disclosed herein include an antenna for harvesting energy from frequency modulation (FM) radio signals comprising a loop element coupled to an energy harvester; and an inductive element coupled to the loop element, wherein the inductive element is a planar inductor designed to allow impedance matching with the energy harvester, wherein the inductive element that extends an electric field of the loop element, wherein the loop element and the inductive element resonate at an FM frequency band.

Certain embodiments disclosed herein include a batteryless wireless device comprising a harvesting antenna for harvesting energy from frequency modulation (FM) radio signals; a communication antenna for receiving and transmitting signals using a low energy communication protocol; and an energy harvester coupled to the harvesting antenna, wherein the energy harvester powers the wireless device from FM radio signals received by the harvesting antenna, wherein the harvesting antenna impedance matches the energy harvester and the communication antenna.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
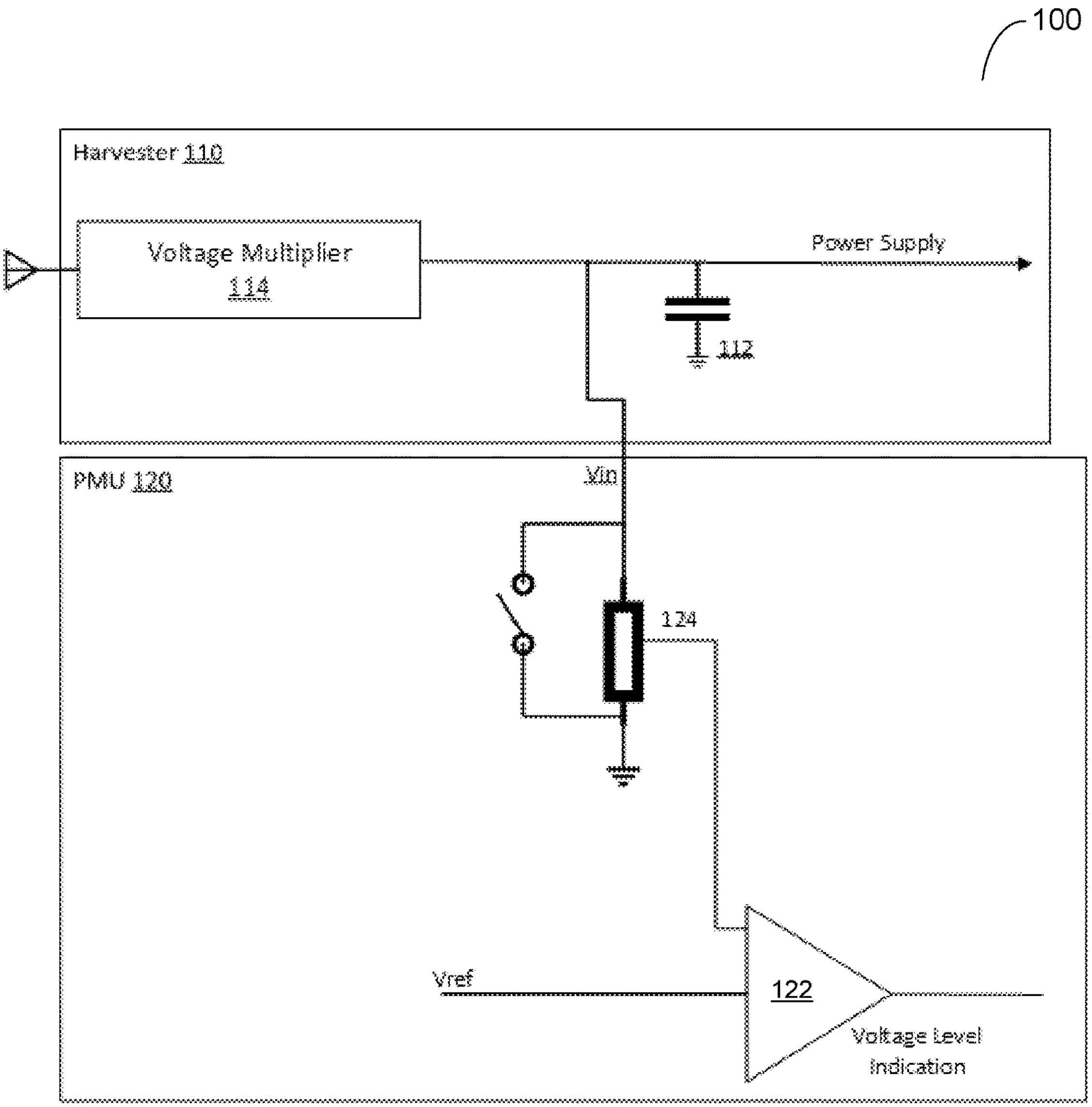
Prior Art FIG. 1
FIG. 1 is a diagram of a conventional harvester system.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a system for harvesting power from FM radio signals. To address the above-noted changes for systems capable of harvesting power from FM sources, and for systems capable of harvesting using components sized for use with IoT devices, the embodiments below disclose aspects of a power harvesting system configured to efficiently harvest power from FM signals while retaining a small package size.

Figure 2:
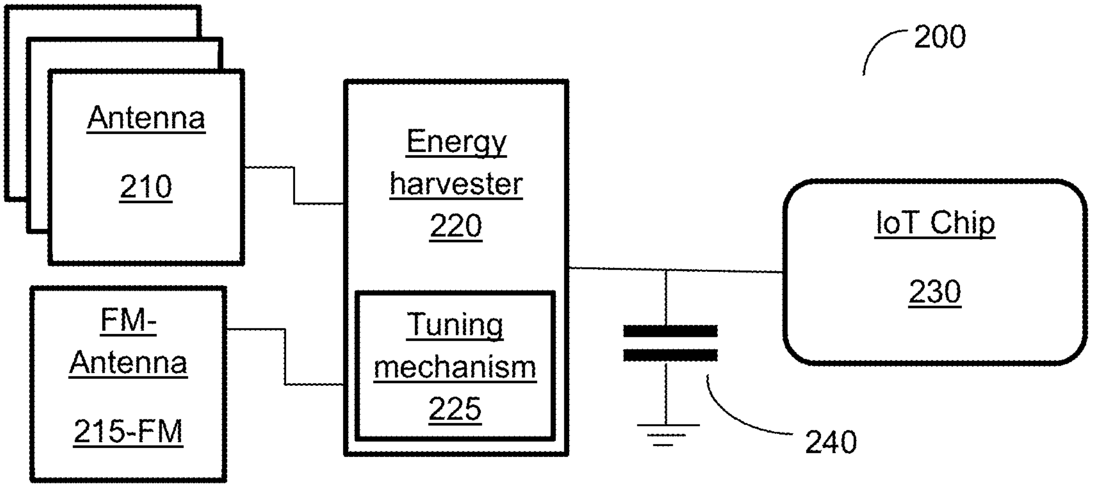
FIG. 2 is a block diagram depicting a power harvesting system configured to provide power to an Internet of things (IoT) device utilized to describe the various disclosed embodiments.

FIG. 2 is an example block diagram depicting a power harvesting system configured to provide power to an Internet of things (IoT) device 200 utilized to describe the various disclosed embodiments. The configuration depicted in FIG. 2 includes one or more antennas 210, an energy harvester 220, and an IoT Integrated Circuit (IC) or simply chip 230. In an embodiment, combinations of antennas 210, energy harvester 220, and IoT chip 230 may be configured to include one or more of each device type, enabling configurations including alternate combinations and configurations.

The one or more antennas 210 may be loop antennas configured to harvest energy from ambient electromagnetic (EM) sources. In an embodiment, one of the antennas (labeled as 215-FM) is designed to harvest power from received FM radio signals. Other antennas may be configured for harvesting energy at different frequency bands and/or transmitting data from the IoT chip 230. Examples for such frequency bands include the BLE band (2.400-2.4835 GHz), the Wi-Fi 2.4 GHz band, and a cellular band (1.7-2 GHz). In an embodiment, signals are transmitted from the IoT chip 230 over the BLE band.

The energy harvester 220 may be a component or assembly configured to convert power harvested at any harvesting antenna 210 or FM antenna 215-FM into power usable by the IoT chip 230. The energy harvester 220, in an embodiment is, a multi-band harvester configured with a plurality of band-specific harvesting units (not shown), each respectively coupled to a different antenna. In an embodiment, one energy harvester 220 is configured to harvest energy from FM signals. Other bands for harvesting may be those bands mentioned above, as well as other, like, bands.

The FM antenna 215-FM is designed for a specific frequency band. However, the respective energy harvester 220 can be tuned to a center frequency at which the signal is received. In order to optimize performance, the energy harvester 220 and a respective FM antenna 215-FM operate at resonance. To this end, in an optional embodiment, a tuning mechanism 225 is included in the energy harvester 220.

The tuning mechanism 225 may be utilized to tune the energy harvester 220 to operate at resonance with the frequency of the received harvesting radio signals. In an embodiment, the tuning mechanism 225 is designed to be activated at very low energy levels so that the tuning may be initiated immediately.

The energy harvested by the energy harvester 220 may be stored in an energy storage, such as the capacitor 240.

The energy harvester 220 may be integrated in the IoT chip 230 (or IoT tag or chip or integrated circuit). Specifically, in an embodiment, the antennas 210, including the FM antenna 215-FM, are fabricated or printed on the same substrate (inlay) that carries the IoT chip 230.

The IoT chip 230 typically receives and transmits wireless signals using a low energy communication protocol, such as, but not limited to, the BLE communication standard. In this configuration, one of the antennas 210 may be configured to serve as the transmit/receive antenna of the IoT chip 230. To this end, a duty cycle including switching between harvesting and receiving/transmitting is implemented. That is, transmission and receiving may occur in non-harvesting time periods. In certain configurations, a dedicated antenna (one of antennas 210) is utilized as the transmit/receive antenna. Thus, each of the antennas 210 may serve for energy harvesting.

The IoT chip 230 may be a sensor, or other device, capable of recording and reporting environmental conditions, an actuator, or other device, capable of causing a change in a separately connected device or an aspect of the IoT chip's 230 environment, or a multi-function device, capable of both recording and influencing aspects of the device's environment.

The antennas 210 and 215-FM are electrically connected to the energy harvester 220 and, thus, to the chip hosting the IoT chip 230. In order to reduce mismatch losses and to increase the sensitivity of harvesting, each antenna 210 and, in particular, the FM antenna 215-FM, are matched to IoT device's interface. Since such an interface presents capacitive and/or inductive impedance, the FM antenna 215-FM is designed as a small loop antenna to meet the size requirements of a small form factor IoT chip 230 as discussed below. The design of the FM antenna 215-FM is used to impedance match the IoT chip 230 as well as any of the antennas 210.

Figure 3:
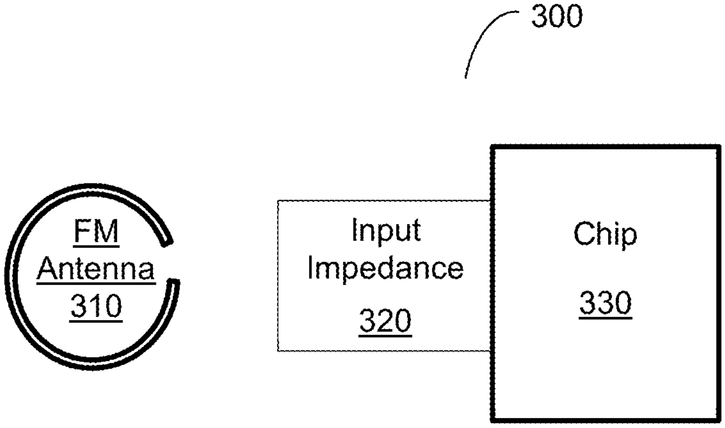
FIG. 3 is a schematic diagram depicting an FM antenna and a chip utilized to describe the various embodiments.

FIG. 3 is an example schematic diagram depicting an FM antenna and a chip utilized to describe the various embodiments. The configuration depicted in the diagram 300 includes an FM antenna 310, an input impedance 320, and a chip 330. The chip 330 is a wireless IoT chip, tag, or integrated circuit. The combination of the FM antenna 310 and chip 330 for the purpose of power harvesting requires consideration of the aspects of the FM antenna 310 and the chip 330 separately, as well as in combination. As a given, the chip includes a capacitive impedance, depicted in the diagram 300 as the input impedance 320, the design of the FM antenna 310 requires matching the FM antenna 310 to the chip 330 and its input impedance 320 to provide for reduced frequency mismatch losses and to increase the sensitivity of power harvesting. According to the disclosed embodiments, the FM antenna 310 is designed as a loop antenna, such as is described below. The design allows for a compact physical footprint for compatibility with wireless devices, and particular IoT devices, as well as for maximum efficiency.

According to the disclosed embodiments, the FM antenna 310 is designed by varying the size of the inductor(s) which are included in the loop antenna, thereby providing greater inductance while retaining preferred package size of the IoT device. The package of a device is a case that includes the circuit materials, which, in an example embodiment, may be about a size of a U.S. quarter coin. Further, the inductive value of the FM antenna's inductive element may allow alterations of the FM antenna's 310 impedance with respect to the chip 330, and any other antenna(s) included in the IoT device.

Figure 4:
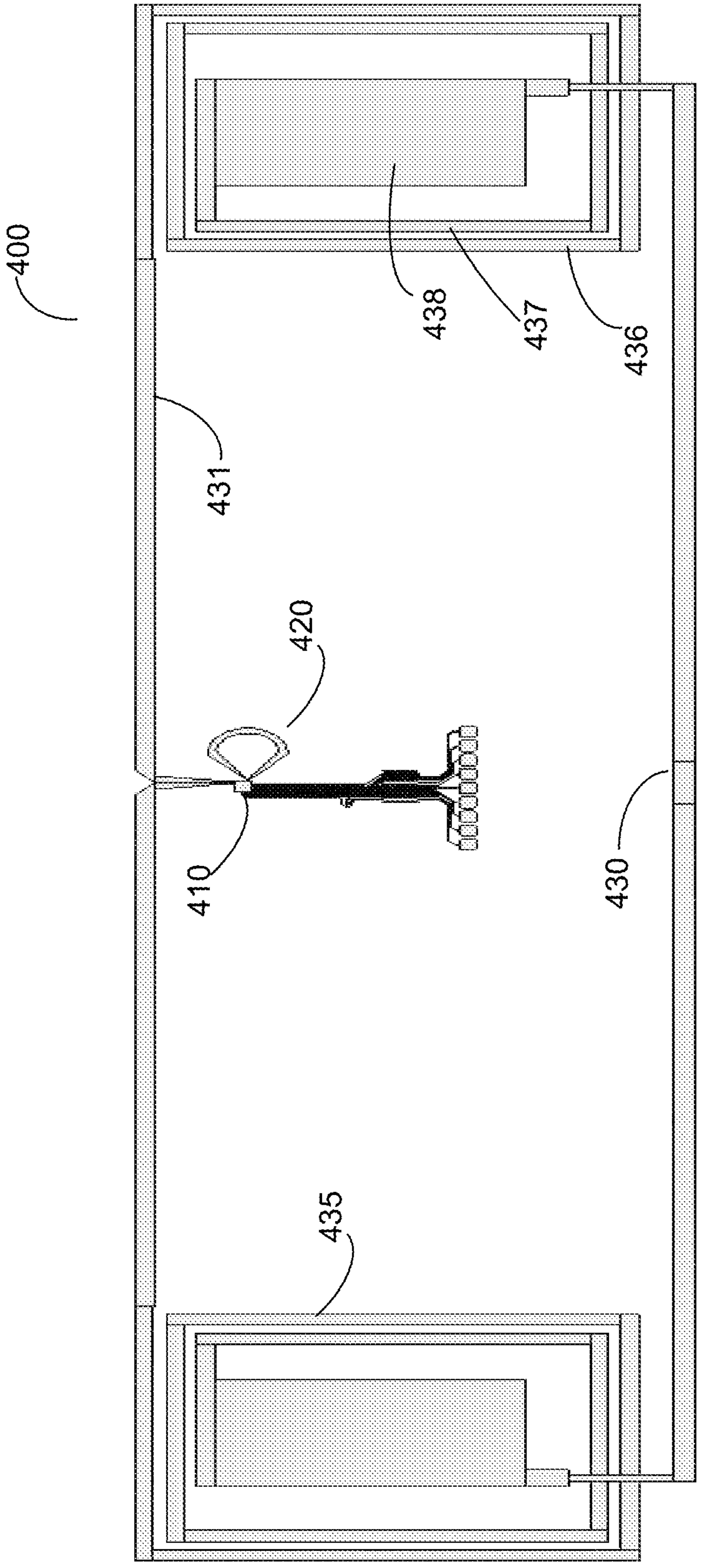
FIG. 4 is an illustration depicting a layout of the IoT device designed according to an embodiment.

FIG. 4 is an example illustration depicting a layout of the IoT device designed according to an embodiment. In the example configuration, the IoT device 400 includes a chip 410 connected to a Bluetooth Low Energy® (BLE) antenna 420 and an FM harvesting antenna 430. The configuration depicted in the IoT device 400 may be applied to harvesting power also in a BLE application using a BLE antenna 420.

The BLE antenna 420, in an embodiment, may be configured to operate at a 2.4 GHz Industrial, Scientific, and Medical (ISM) band. The BLE antenna 420 may be coupled with the FM harvesting antenna 430. The radiation pattern of the BLE antenna 420 may be influenced by factors including, without limitation, impedance matching.

As illustrated in FIG. 4, the FM harvesting antenna 430 is designed as a loop antenna with a loop element 431 and an inductive element 435. In some configurations, the FM harvesting antenna 430 is designed with a capacitance element 438. The inductive element 435, and optionally the capacitance element 438, increases the electrical connectivity length of the loop element, thereby providing a loop antenna operating in the frequency band to have a substantially similar radiation pattern diagram as a dipole antenna while providing a minimally compact design for the FM harvesting antenna 430.

In an example embodiment, the size of the FM harvesting antenna 430 is 30 cm long and 7 cm wide.

Figure 5A:
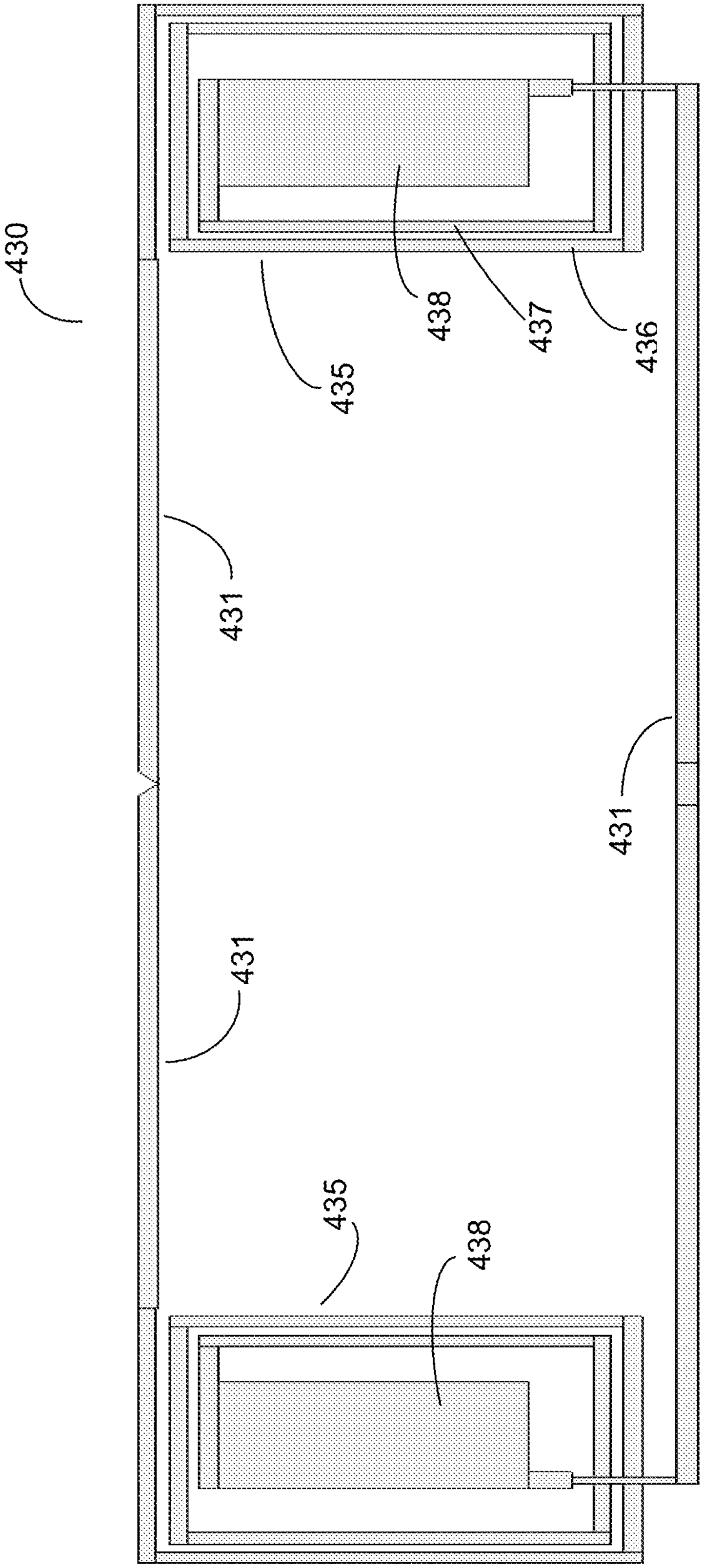
FIG. 5A is an illustration depicting a layout of an FM harvesting antenna according to an embodiment.

Reference is now made to FIG. 5A where an example design of the FM harvesting antenna 430 is disclosed in greater detail. The FM harvesting antenna 430 may include an inductive element 435, depicted in detail with respect to FIGS. 5B and 5C, below. In an embodiment, the inductive element 435 may be a planar inductor or inductors configured to efficiently increase input inductance of the FM harvesting antenna 430. The inductive element 435 may produce a mutual inductance effect, increasing the overall inductance of the FM harvesting antenna 430 beyond the inductance added by the inductive element 435 as individual aspects of the FM harvesting antenna 430.

The FM harvesting antenna 430 also includes a loop element 431, which may be an electrical conductor that feeds into the IoT chip 230. The electrical conductor of the loop element 431 may be printed on the same substrate (inlay) that carries the IoT chip 230. In the embodiment shown in FIG. 5A, the loop element 431 is connected to the inductive element 435 and a capacitance element 438. The loop element may be looped through a via (not shown).

The design configuration of the inductive element 435 determines the inductance contribution of the inductive element 435. The number of turns, depicted with respect to FIG. 5A by a first turn 436 and a second turn 437 of the inductive element 435, may define the overall inductance of an inductive element 435, but may also reduce the radiation efficiency of the FM harvesting antenna 430.

In an embodiment, to address the balancing of radiation efficiency with overall inductance of an inductive element 435, the FM harvesting antenna 430, and any included inductive element 435, may be structured to provide an optimal balance of inductance and radiation efficiency for a given signal frequency. In an embodiment, inductive element 435 may be constructed in a layered pattern, allowing for an increased number of inductor turns and, thus, increased inductance, while minimizing the package size of the FM harvesting antenna 430. The inductive element 435 may be formed by an electrical conductor printed on the same substrate (inlay) that carries the IoT chip 230.

The inductive element 435 may be connected to a capacitance element 438 configured to provide electrical capacitance in the FM harvesting antenna 430. The capacitance element 438 may be realized as a capacitance pad. In some embodiments, the capacitance at the capacitance pad 438 may be tuned by adjusting variable such as, without limitation, capacitance element length, width, thickness, materials, other, like factors, and any combination thereof.

As inductive loop antennas may be constructed according to standard resistance, inductance, and capacitance (RLC) circuit models, the properties of the capacitance element 438 and/or inductive element 435 would determine impedance at the input to the FM harvesting antenna 430. In an embodiment, at least the inductive element 435 is designed to allow optimal impedance matching with the IoT chip and other antenna(s) in the device (e.g., the BLE antenna 420, FIG. 4). In addition, necessary tuning of the FM harvesting antenna 430 system may be achieved by modifying antenna inductance through modification of inductive element 435, for example and without limitation, by number of turns, size, geometry, and layout, as described with respect to FIGS. 5B and 5C, below.

Figure 5B:
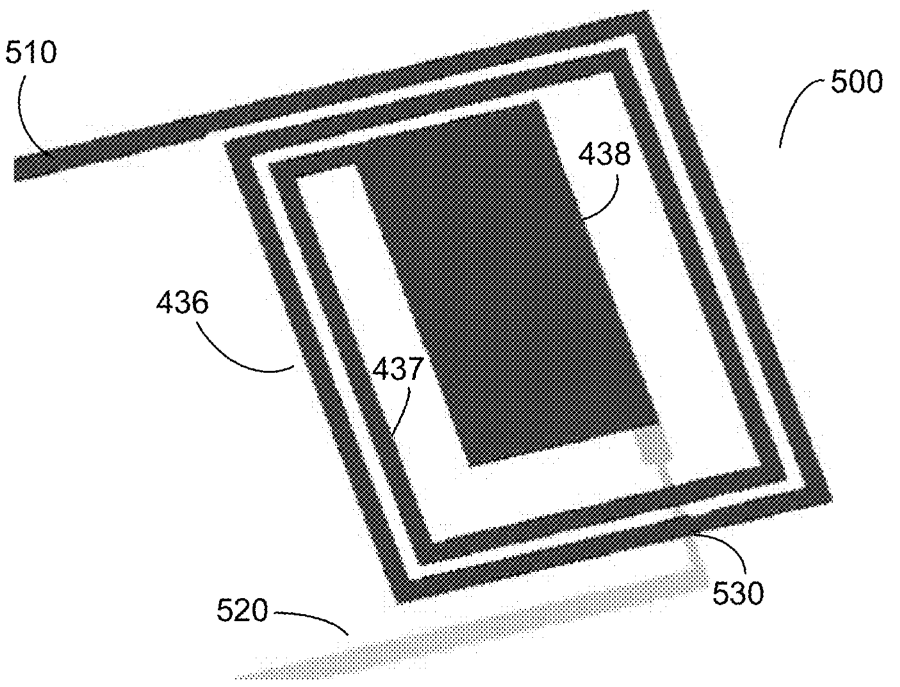
FIG. 5B is an illustration depicting a first layer of a FM harvesting antenna inductor implementation constructed without vias, according to an embodiment.
Figure 5C:
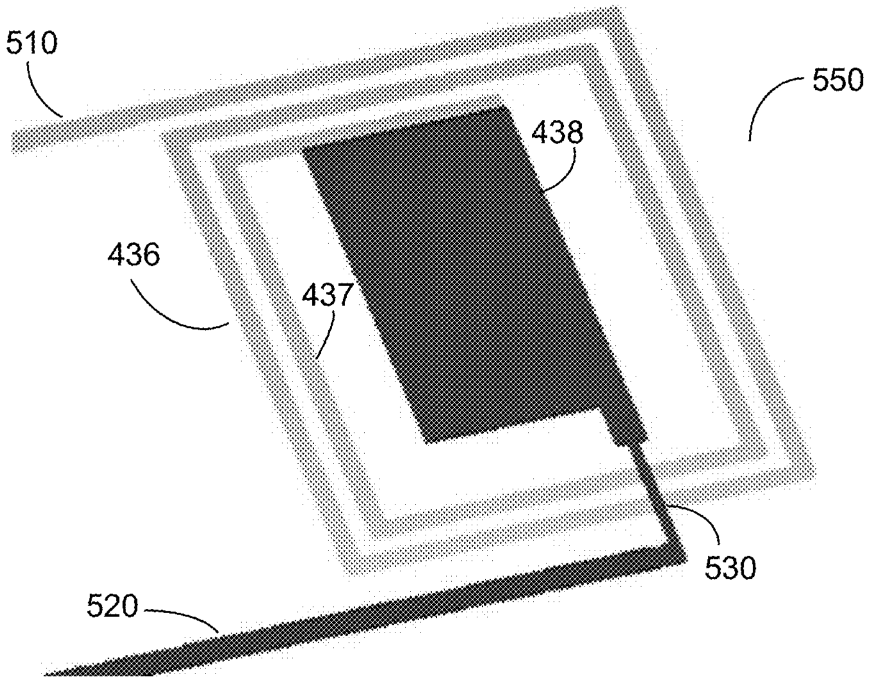
FIG. 5C is an illustration depicting a FM harvesting antenna inductor implementation constructed without vias, according to an embodiment.

FIG. 5B is an example illustration 500 depicting a first layer of an antenna inductive element implementation constructed without vias, according to an embodiment. FIG. 5C is an example illustration 550 depicting the second layer of an antenna inductive element implementation constructed without vias, according to an embodiment. FIGS. 5B and 5C illustrate an inductive element such as element 435 of FIG. 5A, above, with different layers shaded across the figures to emphasize aspects of the inductive element construction.

In the example, the inductive element includes a first turn 436, a second turn 437, and a capacitance element 438, which are described with respect to FIG. 5A, above. The inductive element may be separated into a first layer 510 and a second layer 520 which may be stacked one on top of the other. Stacking the first 510 and second 520 layers of the inductive element may allow increased inductance while preserving antenna package size, thereby providing for efficient energy harvesting and compatibility with various devices.

The first 510 and second 520 layers may be electrically connected at layer transitions 530. In the examples 500 and 550, of FIGS. 5B and 5C respectively, layer transitions 530 occur at points where the paths of the first layer 510 and second layer 520 overlap. In an embodiment, the transition, or transitions 530 may be disposed at points proximate to the capacitance element 438. Where one or more transitions 530 are disposed at points proximate to the capacitance element 438, electrical transition between the layers may be made more efficient by tuning the capacitance element 438, as described above, in addition to the frequency-related effects of such tuning.

In an embodiment, inductive element, and specifically the first 500 and second layers 550 are printed on, or otherwise made to adhere to, a substrate of the chip. The substrate may be, for example, Low Temperature Co-fired Ceramic (LTCC), Polyethylene Terephthalate (PET), paper, and the like.

Figure 6:
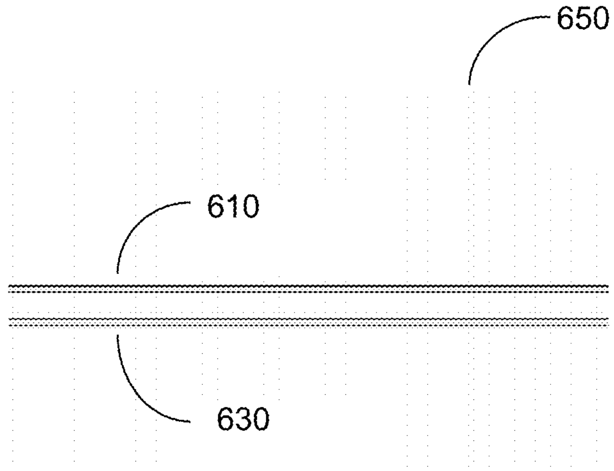
FIG. 6 is an illustration depicting a detail view of a transition by coupling constructed without vias, according to an embodiment.

FIG. 6 is an illustration 650 depicting a detail view of a transition by coupling constructed without vias, according to an embodiment. The illustration 650 depicts a first layer 610 not connected to a second layer 630 by a via.

In an embodiment, the first 610 and second 630 layers may be electrically connected by a coupling connection. In an embodiment, the coupling is achieved by means of capacitive coupling.

It should be noted that in certain embodiments, and depending on the type of the substrate, the electronic connection between the first 610 and the second 630 layers of the FM harvesting antenna's inductive element is achieved by means of vias.

Figure 7:
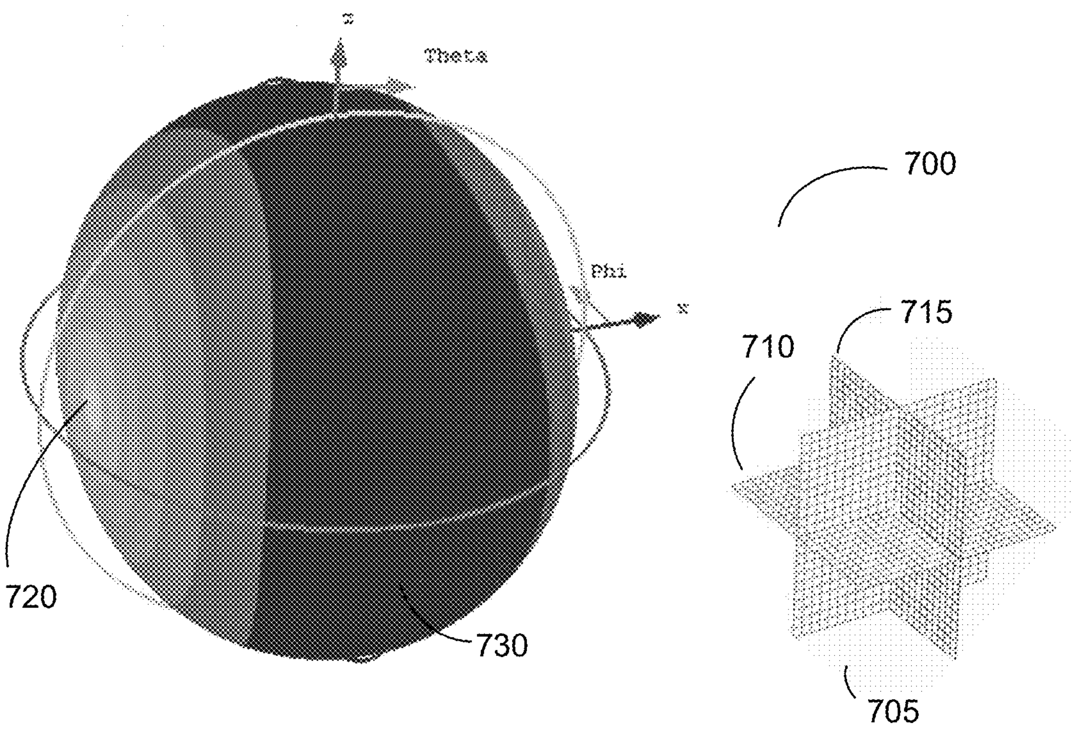
FIG. 7 is a radiation pattern diagram depicting the radiation pattern of an FM harvesting antenna, according to an embodiment.

FIG. 7 is an example radiation pattern diagram 700 depicting the radiation pattern of an FM harvesting antenna structured according to an embodiment. The example radiation pattern 700 shows a coordinate system 705, indicating the plane 710 of an FM harvesting antenna, and including a local minimum 720 signal strength and a local maximum 730 signal strength. In an embodiment, the FM harvesting antenna may lie in an alternate plane 715 without altering the relative locations of the local minimum 720 and maximum 730 signal strengths.

The radiation pattern for an FM harvesting antenna may include a null zone, corresponding with the local minimum 720, located above the plane 710 of the antenna. The location of such a null zone may be visualized by rotating the radiation pattern depicted by ninety degrees about the intersection formed between the plane 710 of the antenna and the alternate plane 715. Where the FM harvesting antenna is combined with an inductor, as described in the various embodiments, a phase shift may be noted, resulting in a radiation pattern similar to that of a large loop antenna, as shown in the example radiation pattern diagram 700. The shift depicted in the radiation pattern diagram 700 may be attributed to a phase shift between the sides of the small loop of the FM harvesting antenna, as described above, thereby improving energy harvest efficiency. It should be appreciated that the radiation pattern as demonstrated in diagram 700 is of a loop antenna, but substantially similar to a radiation pattern of a dipole antenna.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. An antenna for harvesting energy from frequency modulation (FM) radio signals, comprising:

a loop antenna portion of the antenna coupled to an energy harvester; and at least one planar inductor including an electrical conductor shaped with at least one turn connected to the loop antenna portion so as to provide impedance matching to the energy harvester, wherein the at least one planar inductor is configured to increase an inductance of the loop antenna portion relative to inductance of the loop antenna portion absent the planar inductor to thereby increase an electrical connectivity length of the loop antenna portion, wherein the increased electrical connectivity length causes the loop antenna portion, when operating, to operate in an FM frequency band with a radiation pattern substantially the same as that of a dipole antenna in the FM frequency band and to extend an electric field of the loop antenna portion and, wherein the loop antenna portion and the at least one planar inductor are adapted to resonate at the FM frequency band.

2. The antenna of claim 1, further comprises:

a capacitance portion, wherein the capacitance portion is configured to provide electrical capacitance to the loop antenna portion.

3. The antenna of claim 2, wherein the capacitance portion optimizes impedance matching to the energy harvester.

4. The antenna of claim 2, wherein the capacitance portion is realized as a capacitive pad.

5. The antenna of claim 1, wherein the at least one planar inductor includes an electrical conductor shaped with multiple turns.

6. The antenna of claim 5, wherein the antenna is structured on a multi-layer substrate; and wherein the multi-layer substrate includes at least a first layer and a second layer, wherein the first layer includes the loop antenna portion and a capacitance portion, and the second layer includes the capacitance portion, wherein the first layer is stacked on top of the second layer.

7. An antenna for harvesting energy from frequency modulation (FM) radio signals, comprising:

a loop antenna portion of the antenna coupled to an energy harvester; and at least one planar inductor adapted to provide impedance matching to the energy harvester, wherein the at least one planar inductor extends an electric field of the loop antenna portion, wherein the loop antenna portion and the at least one planar inductor are adapted to resonate at an FM frequency band;

wherein the antenna is structured on a multi-layer substrate; and wherein the multi-layer substrate includes at least a first layer and a second layer, wherein the first layer includes the loop antenna portion and a capacitance portion, and the second layer includes the capacitance portion, wherein the first layer is stacked on top of the second layer.

8. The antenna of claim 7, wherein the first layer and the second layer are coupled by means of any of: capacitive coupling, inductive coupling, and electrical coupling.

9. The antenna of claim 1, wherein at least the loop antenna portion and the at least one planar inductor are printed on a substrate, wherein the substrate is any one of: low temperature co-fired ceramic (LTCC), polyethylene terephthalate (PET), and paper.

10. A battery-less wireless device, comprising:

a harvesting antenna for harvesting energy from frequency modulation (FM) radio signals;

a communication antenna for receiving and transmitting signals using a low energy communication protocol; and an energy harvester coupled to the harvesting antenna, wherein the energy harvester powers the wireless device by harvesting FM radio signals impinging upon a loop antenna portion of the harvesting antenna, wherein the loop antenna portion of the harvesting antenna is impedance matched to the energy harvester and the communication antenna using at least one planar inductor that is part of the harvesting antenna to provide the impedance matching.

11. The wireless device of claim 10, wherein the energy communication protocol is a Bluetooth low energy (BLE).

12. The wireless device of claim 10, wherein the at least one planar inductor is configured to increase an inductance of the loop antenna portion relative to inductance of the loop antenna portion absent the planar inductor to thereby increase an electrical connectivity length of the loop antenna portion, wherein the increased electrical connectivity length causes the loop antenna portion, when operating, to operate in an FM frequency band with a radiation pattern substantially the same as that of a dipole antenna in the FM frequency band and to extend an electric field of the loop antenna portion, wherein the loop antenna portion and the at least one planar inductor resonate at an FM frequency band.

13. The wireless device of claim 12, wherein the harvesting antenna further comprises:

a capacitance portion, wherein the capacitance portion is configured to provide electrical capacitance to the loop antenna portion.

14. The wireless device of claim 13, wherein the capacitance portion of the harvesting antenna is selected to optimize impedance matching with the energy harvester.

15. The wireless device of claim 13, wherein the capacitance portion of the harvesting antenna is realized as a capacitive pad.

16. The wireless device of claim 12, wherein the at least one planar inductor of the harvesting antenna includes an electrical conductor shaped with multiple turns.

17. The wireless device of claim 16, wherein the harvesting antenna is structured on a multi-layer substrate.

18. The wireless device of claim 17, wherein multi-layer substrate of the harvesting antenna includes at least a first layer and a second layer, wherein the first layer includes the at least one planar inductor and a capacitance portion, and the second layer includes the capacitance portion, wherein the first layer is stacked on top of the second layer.

19. The wireless device of claim 18, wherein the first layer and the second layer of the harvesting antenna are coupled by means of any of: capacitive coupling, inductive coupling, and electrical coupling.

20. The wireless device of claim 12, wherein at least the loop antenna portion and the at least one planar inductor are printed on a substrate, wherein the substrate is any one of: low temperature co-fired ceramic (LTCC), polyethylene terephthalate (PET), and paper.

* * * * *